US012366872B2

(12) United States Patent
Fesler

(10) Patent No.: US 12,366,872 B2
(45) Date of Patent: Jul. 22, 2025

(54) ELECTRONIC DEVICE WITH REDUCED PROCESS SPREAD BANDGAP

(71) Applicant: NEXPERIA B.V., Nijmegen (NL)

(72) Inventor: Eric Fesler, Raleigh, NC (US)

(73) Assignee: Nexperia B.V., Nijmegen (NL)

( * ) Notice: Subject to any disclaimer, the term of this patent is extended or adjusted under 35 U.S.C. 154(b) by 48 days.

(21) Appl. No.: 18/458,658

(22) Filed: Aug. 30, 2023

(65) Prior Publication Data

US 2025/0076908 A1 Mar. 6, 2025

(51) Int. Cl.
*G05F 3/30* (2006.01)
*G05F 1/567* (2006.01)

(52) U.S. Cl.
CPC ................ *G05F 1/567* (2013.01); *G05F 3/30* (2013.01)

(58) Field of Classification Search
None
See application file for complete search history.

(56) References Cited

U.S. PATENT DOCUMENTS 4,234,841 A * 11/1980 Schade, Jr. ............. G05F 3/267 330/257
10,712,763 B2 * 7/2020 Mouret ................... G05F 3/267
11,086,347 B1 * 8/2021 Shou .......................... G05F 3/20
2013/0241524 A1 * 9/2013 Inoue ........................ G05F 3/30 323/313
2016/0274617 A1 * 9/2016 Wadhwa .................. G05F 3/30

* cited by examiner

*Primary Examiner* — Thomas J. Hiltunen
(74) *Attorney, Agent, or Firm* — Ruggiero McAllister & McMahon LLC

(57) ABSTRACT

An electronic device is provided, including: a terminal configured for receiving a bandgap voltage reference, generated by incorporating a first base-emitter voltage subject to process variation; the electronic device including a first transistor with a base configured to be exposed to the bandgap voltage reference; the first transistor is biased with a constant collector current corresponding with the first base-emitter voltage, and is configured for providing a shifted voltage, VE, based on decreasing the bandgap voltage reference by a second base-emitter voltage subject to the process variation; and the electronic device including a second transistor, of the same type as the first transistor, including an emitter configured to be exposed to the shifted voltage; and the second transistor is biased with a constant base current and is configured for providing a restored bandgap voltage based on increasing the shifted voltage by a third base-emitter voltage.

8 Claims, 3 Drawing Sheets

ELECTRONIC DEVICE WITH REDUCED PROCESS SPREAD BANDGAP

BACKGROUND

1. Field of the Disclosure

The present application relates to electronic devices, in particular electronic devices having a bandgap voltage reference.

2. Description of the Related Art

Transistors, specifically bipolar junction transistors BJTs are fundamental components in electronic devices and integrated circuits, enabling amplification, switching, and signal processing. However, despite their importance, the performance and characteristics of transistors can be influenced by inherent variations that occur during the manufacturing process, known as process variations.

Process variations in transistors are primarily attributed to variations in the fabrication process including lithography, doping, and diffusion steps. These variations can lead to deviations in critical transistor parameters, such as current gain (β), base-emitter voltage (VBE), and cutoff frequency, among others. As a result, process variations can cause inconsistencies in transistor performance, impacting device functionality, reliability, and yield.

The sources of process variations in transistors are numerous. Variations in doping levels, and implantation depths during fabrication can directly affect the electrical characteristics of the transistor. Additionally, variations in lithography and etching processes can impact the dimensions and alignment of the transistor structure, leading to variations in channel width, length, and contact areas.

Process variations in transistors pose significant challenges for circuit designers and manufacturers, as they can hinder the achievement of desired performance specifications and complicate the design optimization process. Addressing and mitigating process variations are crucial to ensuring consistent and reliable transistor behavior across different devices and manufacturing batches.

Process variation of the base-emitter voltage VBE varies inversely with process variation in the current gain β because both are primarily affected by variations in the base Gummel number, which is a parameter related to the BJT fabrication process.

In other words, VBE and β of a BJT are influenced by process variations, which are inherent variations that occur during the manufacturing process. Thus, process variations in VBE and β exhibit an inverse relationship: $VBE \propto 1/\beta$. In other words, if VBE increases due to process variation, β is likely to decrease, and vice versa.

VBE also varies directly with collector current IC, and $IC=\beta*IB$. There is a direct relationship between the base-emitter voltage VBE and the collector current IC in a BJT. The collector current IC is dependent on the product of the current gain β and the base current IB. Therefore, an increase in IC will result in an increase in VBE, and vice versa.

SUMMARY

In a bipolar junction transistor BJT, the base-emitter voltage VBE is influenced by various factors, including process variation and the collector current IC. Typically, base-emitter voltage VBE varies directly with collector current IC, meaning that an increase in collector current IC leads to an increase in base-emitter voltage VBE. Process variation causes VBE to vary and β with it. This relationship is inverse, and how tightly coupled the two variations are, depends on the process and the specific bipolar transistor within the process.

By maintaining a constant base current IB rather than a constant collector current IC, the process variation of VBE is partially canceled out by the β variation. When the base current IB is kept constant, the process corners with high or low base-emitter voltage VBE will have low or high, respectively, collector current IC which reduces VBE and thus overall VBE variation across the process.

This approach of controlling VBE through a constant IB is generally useful but can be particularly useful in certain applications where accurate and consistent voltage references or biasing are required.

By minimizing the impact of process variations on VBE, it becomes easier to achieve desired performance and stability in circuits utilizing BJTs.

Accordingly, there is provided in a first aspect of the present disclosure an electronic device according to claim 1, said electronic device comprising: a terminal configured for receiving a bandgap voltage reference, VBG, generated by incorporating a first base-emitter voltage, VBE1; the first base-emitter voltage, VBE1, being subject to process variation; a first transistor comprising a base configured to be exposed to the bandgap voltage reference, VBG; wherein the first transistor is biased with a constant collector current, IC, corresponding with the first base-emitter voltage, VBE1, and is configured for providing a shifted voltage, VE, based on decreasing the bandgap voltage reference, VBG, by a second base-emitter voltage, VBE2; the second base-emitter voltage, VBE2, being subject to said process variation; and a second transistor, of the same type as the first transistor, comprising an emitter configured to be exposed to the shifted voltage, VE; wherein the second transistor is biased with a constant base current, IB, and is configured for providing a restored bandgap voltage, VBG2, based on increasing the shifted voltage, VE, by a third base-emitter voltage, VBE3.

VBE process variation can be improved by running the base-emitter voltage VBE at a constant base current IB rather than the collector current IC and that this forms a simple and more-process insensitive approach. In other words, by controlling IB instead of IC, the variation in VBE can be reduced or made more consistent across different transistors or manufacturing processes.

In other words, it can be established that running a BJT at a constant base current markedly improves the VBE variation across bipolar process corners. Therefore, in various embodiments of the electronic device according to the present disclosure, an existing bandgap reference can be taken (with or without curvature correction) and the high process variability VBE can be replaced with a more process-insensitive one. This can be accomplished by subtracting out the old VBE and adding in the new in a simple and process-independent way.

In other words, an existing bandgap voltage reference VBG can be used and can be taken down a constant IC biased VBE and then taken up a constant IB biased VBE. This can help to avoid the offsets (current or voltage) associated with a summing amplifier to the PTAT reference.

The third base-emitter voltage VBE3 does not introduce the process variation back into the signal, because its effective process variation is compensated by running the second transistor at the constant base current IB. In other words, the third base-emitter voltage, VBE3, can be considered "clean" from said process variation, because it is not related to a fixed current, but to a β-proportional collector current (e.g. a PTAT current). Also note that, in some embodiments, the bandgap voltage reference, VBG, may be curvature-corrected, whereas in other embodiments, it may not be curvature-corrected.

In some embodiments, the third base-emitter voltage, VBE3, is based on a proportional to absolute temperature, PTAT, current.

In some embodiments, the electronic device comprises a branch connected to the emitter of the first transistor and to the emitter of the second transistor, such that the branch is configured to carry a summed emitter current, IE. Note that this summed emitter current is equal to β*IB+ICORE.

In some embodiments, the electronic device comprises a current mirror arranged to mirror the summed emitter current, IE; wherein the current mirror comprises: a first branch configured for carrying a scaled base current, β*IB, and a core current, ICORE; and a second branch configured for carrying the summed emitter current, IE.

In some embodiments according to a first alternative, the first branch comprises:

- a current mirror arranged to mirror the scaled base current, β*IB, supplied to the collector of the second transistor;
- a transistor comprising a base configured to be exposed to the constant base current, IB; wherein said transistor is configured for providing the scaled base current, β*IB, in the first branch; and
- a terminal arranged to supply the core current, ICORE, into the first branch, to be summed with said scaled base current, β*IB.

In some embodiments according to a second alternative, the first branch comprises:

- a current mirror arranged to mirror the core current, ICORE, supplied to the collector of the first transistor; and
- a transistor arranged in parallel to said current mirror of the first branch; wherein said transistor comprises a base configured to be exposed to the constant base current, IB; and wherein said transistor is configured for providing the scaled base current, β*IB, into the first branch, to be summed with said mirrored core current, ICORE.

In some embodiments, the first base-emitter voltage, VBE1, is subject to process variation due to being generated by a bandgap core transistor, and wherein the first transistor and the second transistor are of the same type as the core transistor.

The embodiments described herein are provided for illustrative purposes and should not be construed as limiting the scope of the disclosure. It is to be understood that the disclosure encompasses other embodiments and variations that are within the scope of the appended claims. The disclosure is not restricted to the specific configurations, arrangements, and features described herein. The disclosure has wide applicability and should not be limited to the specific examples provided. The embodiments disclosed are merely exemplary, and the skilled person will appreciate that various modifications and alternative designs can be made without departing from the scope of the disclosure.

BRIEF DESCRIPTION OF DRAWINGS

In the following description, a number of exemplary embodiments will be described in more detail, to help understanding, with reference to the appended drawings, in which.

DETAILED DESCRIPTION

Figure 1:
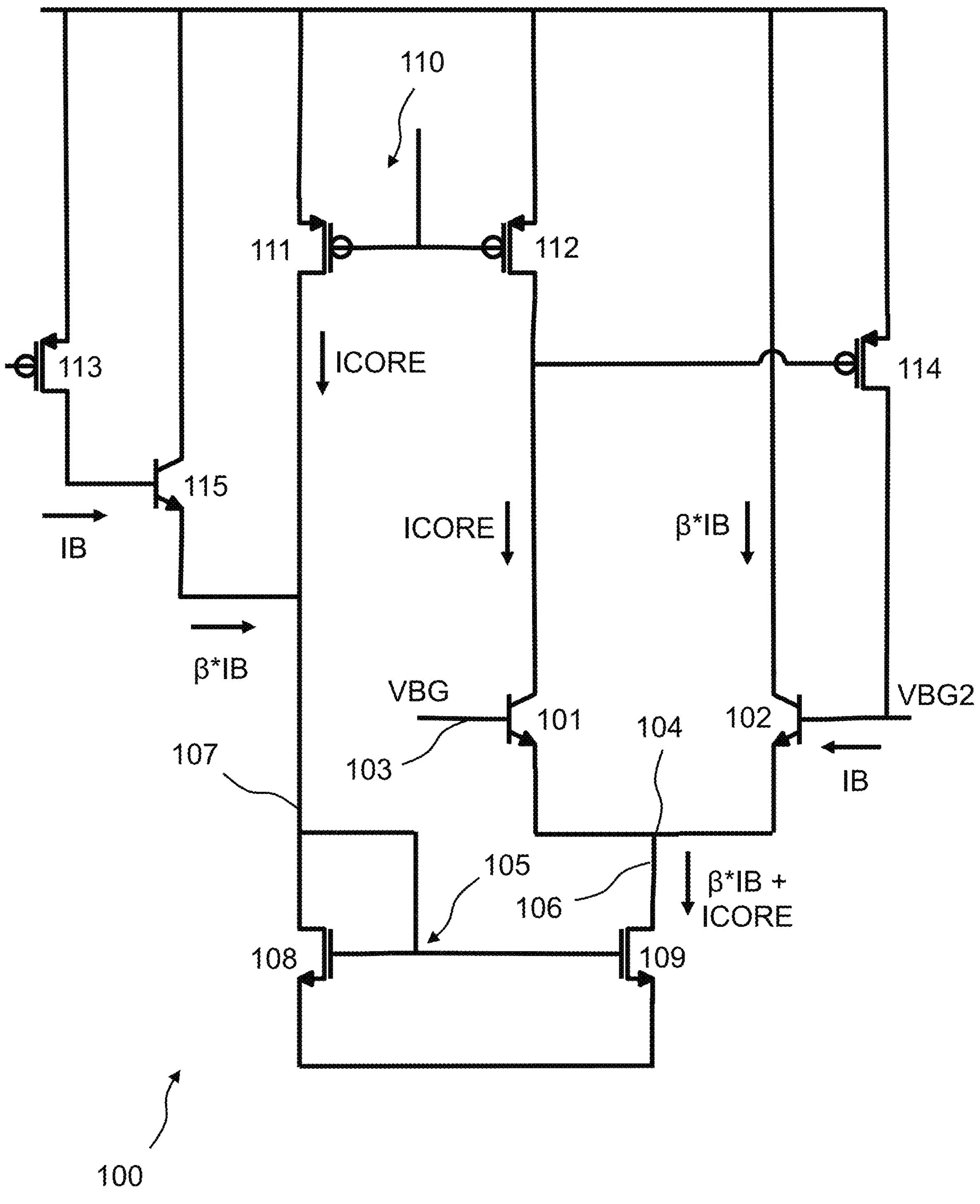
FIG. 1 schematically illustrates a first embodiment of the electronic device according to the present disclosure.

FIG. 1 schematically illustrates a first embodiment 100 of the electronic device according to the present disclosure.

The electronic device 100 comprises: a terminal 103 configured for receiving a bandgap voltage reference, VBG, generated by incorporating a first base-emitter voltage, VBE1; the first base-emitter voltage, VBE1, being subject to process variation; a first transistor 101 comprising a base configured to be exposed to the bandgap voltage reference, VBG; wherein the first transistor is biased with a constant collector current, IC, corresponding with the first base-emitter voltage, VBE1, and is configured for providing a shifted voltage, VE, based on decreasing the bandgap voltage reference, VBG, by a second base-emitter voltage, VBE2; the second base-emitter voltage, VBE2, being subject to said process variation; and a second transistor 102, of the same type as the first transistor, comprising an emitter configured to be exposed to the shifted voltage, VE; wherein the second transistor is biased with a constant base current, IB, and is configured for providing a restored bandgap voltage, VBG2, based on increasing the shifted voltage, VE, by a third base-emitter voltage, VBE3.

The third base-emitter voltage VBE3 does not introduce the process variation back into the signal, because its effective process variation is compensated by running the second transistor at the constant base current IB.

The base current for the bipolar differential pair is injected into the VBG node. This node is likely either low-impedance or already compensated for the existing bandgap base current depending on the bandgap topology.

Furthermore, the electronic device 100 may comprise a branch 104 connected to the emitter of the first transistor 101 and to the emitter of the second transistor 102, such that the branch 104 is configured to carry a summed emitter current, IE. This summed emitter current IE may be equal to β*IB+ICORE, as shown in the figure.

Furthermore, the electronic device 100 may comprise a current mirror 105 arranged to mirror the summed emitter current, IE. The current mirror 105 may comprise: a first branch 107 configured for carrying a scaled base current, β*IB, and a core current, ICORE (which may be equal to the constant collector current IC); and a second branch 106 configured for carrying the summed emitter current, IE.

The current mirror 105 may further comprise transistors 108 and 109.

Furthermore, the first branch 107 may comprise: a current mirror 110 arranged to mirror the core current, ICORE, supplied to the collector of the first transistor 101. The current mirror 110 may comprise transistors 111 and 112.

The first branch 107 may further comprise: a transistor 115 arranged in parallel to said current mirror 110 of the first branch 107. Said transistor 115 may comprise a base configured to be exposed to the constant base current, IB; and said transistor 115 may be configured for providing the scaled base current, β*IB, into the first branch 107, to be summed with said mirrored core current, ICORE.

Alternatively, one could tap off the old PTAT voltage and use a summer to add the PTAT to the "constant base current"

VBE. However, this approach requires more transistors and has a greater opportunity for mismatch and other nonidealities.

Figure 2:
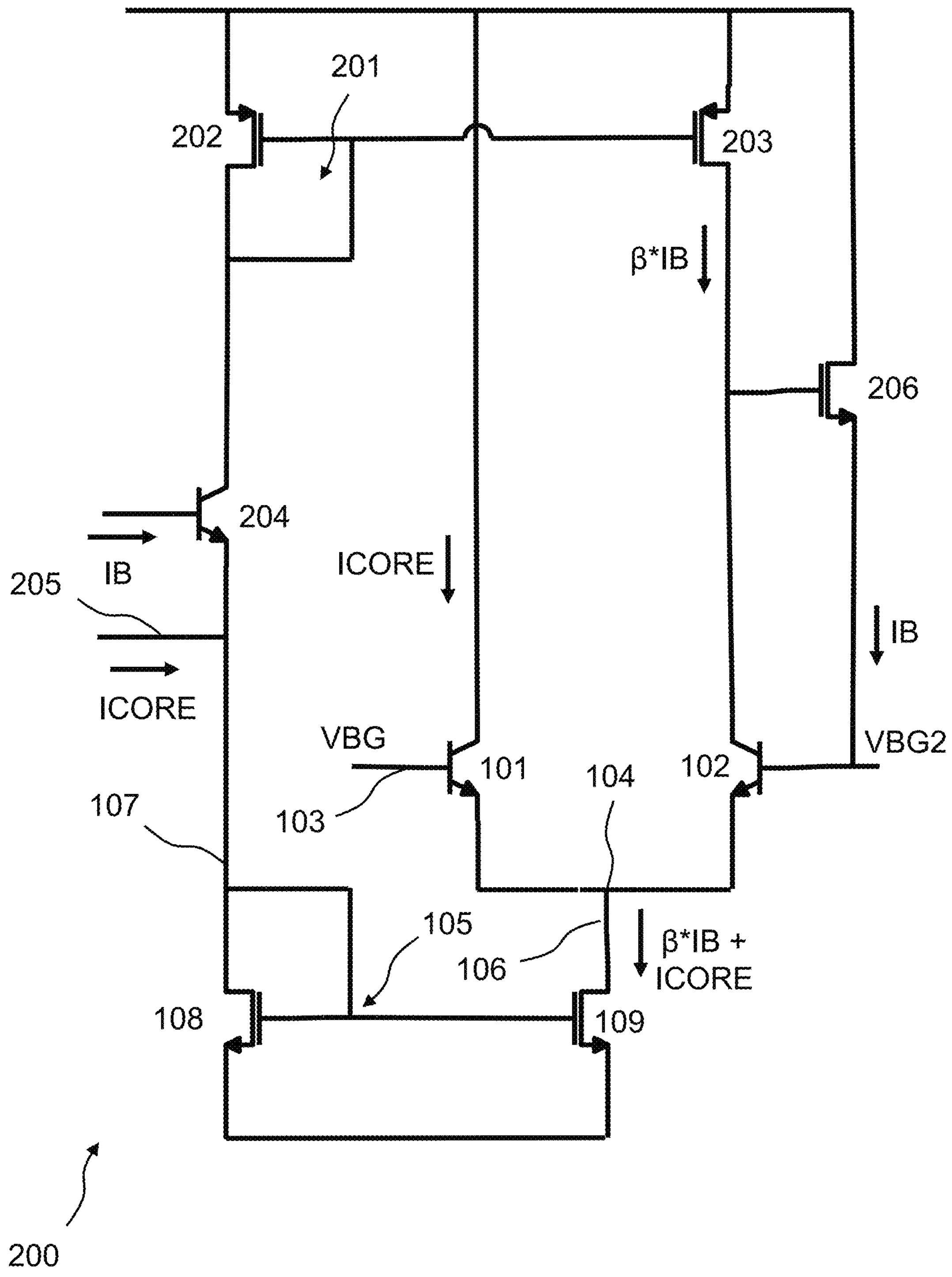
FIG. 2 schematically illustrates a second embodiment of the electronic device according to the present disclosure.

FIG. 2 schematically illustrates a second embodiment 200 of the electronic device according to the present disclosure. Here, as in the first embodiment described above, the electronic device 200 comprises: a terminal 103 configured for receiving a bandgap voltage reference, VBG, generated by incorporating a first base-emitter voltage, VBE1; the first base-emitter voltage, VBE1, being subject to process variation; a first transistor 101 comprising a base configured to be exposed to the bandgap voltage reference, VBG; wherein the first transistor is biased with a constant collector current, IC, corresponding with the first base-emitter voltage, VBE1, and is configured for providing a shifted voltage, VE, based on decreasing the bandgap voltage reference, VBG, by a second base-emitter voltage, VBE2; the second base-emitter voltage, VBE2, being subject to said process variation; and a second transistor 102, of the same type as the first transistor, comprising an emitter configured to be exposed to the shifted voltage, VE; wherein the second transistor is biased with a constant base current, IB, and is configured for providing a restored bandgap voltage, VBG2, based on increasing the shifted voltage, VE, by a third base-emitter voltage, VBE3.

Furthermore, the electronic device 200 may comprise a branch 104 connected to the emitter of the first transistor 101 and to the emitter of the second transistor 102, such that the branch 104 is configured to carry a summed emitter current, IE. This summed emitter current IE may be equal to β*IB+ICORE, as shown in the figure.

Furthermore, the electronic device 200 may comprise a current mirror 105 arranged to mirror the summed emitter current, IE. The current mirror 105 may comprise: a first branch 107 configured for carrying a scaled base current, β*IB, and a core current, ICORE (which may be equal to the constant collector current IC); and a second branch 106 configured for carrying the summed emitter current, IE.

The current mirror 105 may further comprise transistors 108 and 109.

Furthermore, the first branch 107 may comprise: a current mirror 201 arranged to mirror the scaled base current, β*IB, supplied to the collector of the second transistor 102; a transistor 204 comprising a base configured to be exposed to the constant base current, IB; wherein said transistor is configured for providing the scaled base current, β*IB, in the first branch; and a terminal 205 arranged to supply the core current, ICORE, into the first branch 107, to be summed with said scaled base current, β*IB.

It is noted that, in other words, the transistor 204 is thus arranged to generate the scaled base current, i.e. β*IB. That current goes two places: out of the base to make part of the tail current and through the current mirror to force the second transistor 102 to conduct the same current (once the loop is closed).

The second embodiment 200 mitigates the risk of mismatch (both random and systematic). Errors in the tail current are less likely to corrupt the current in the second transistor 102. The current through the second transistor 102 will likely be very low at cold and low β to avoid throwing away current at hot and high β.

In practice, the second embodiment 200 allows more reasonable current levels to be chosen to achieve a given performance.

The topology of the embodiments described in the present disclosure also helps to provide a low impedance bandgap reference.

Figure 3:
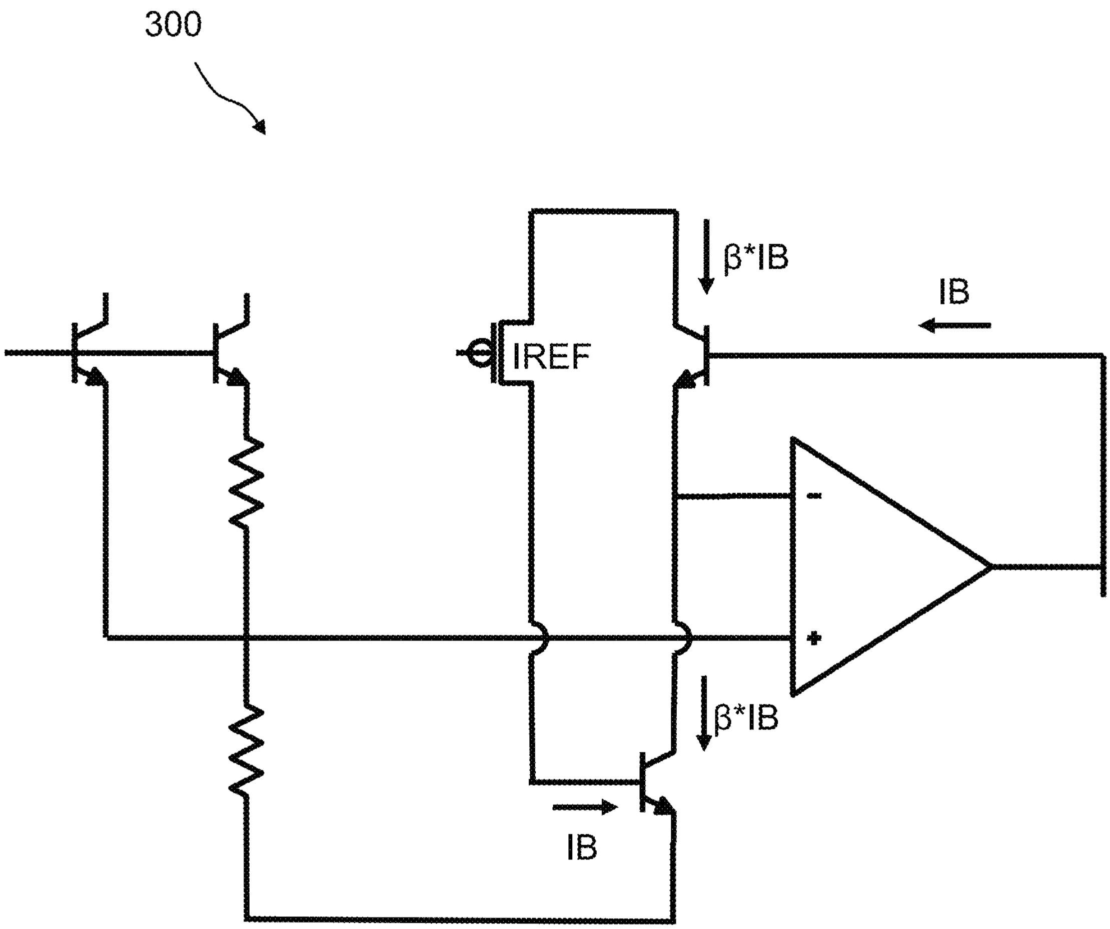
FIG. 3 schematically illustrates an example of a core circuit relating to the present disclosure.

FIG. 3 schematically illustrates a core circuit arranged for supplying the described bandgap voltage reference and various other currents including IB and β*IB.

It is noted that other embodiments according to the present disclosure may be designed with PNPs as well as with NPNs. The MOSFETs shown in the exemplary first and second embodiments described above are primarily used as mirrors, so the circuit may also be seen as independent of MOSFET type or voltage rating, and the circuit could thus be designed without MOSFETs, using BJTs only.

As used in this application and in the claims, the singular forms "a," "an," and "the" include the plural forms unless the context clearly dictates otherwise. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "obtaining" and "outputting" to describe the disclosed methods. These terms are high-level abstractions of the actual operations that are performed. The actual operations that correspond to these terms will vary depending on the particular implementation and are readily discernible by the skilled person.

It will be appreciated that for simplicity and clarity of illustration, where appropriate, reference numerals may have been repeated among the different figures to indicate corresponding or analogous elements. In addition, numerous specific details are set forth in order to provide a thorough understanding of the examples described herein. However, it will be understood by the skilled person that the examples described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the examples described herein.

LIST OF REFERENCE NUMBERS

100 first embodiment
101 first transistor
102 second transistor
103 terminal
104 branch
105 current mirror
106 second branch

107 first branch
108 transistor
109 transistor
110 current mirror
111 transistor
112 transistor
113 transistor
114 transistor
115 transistor
200 second embodiment
201 current mirror
202 transistor
203 transistor
204 transistor
205 terminal
206 transistor
300 core circuit

What is claimed is:

1. An electronic device comprising:

a terminal configured for receiving a bandgap voltage reference (VBG), generated by incorporating a first base-emitter voltage (VBE1), wherein the VBE1 is subject to process variation;

a first transistor comprising a base configured to be exposed to the VBG, wherein the first transistor is biased with a constant collector current (IC) corresponding with the VBE1, and is configured for providing a shifted voltage (VE) based on decreasing the VBG by a second base-emitter voltage (VBE2), and wherein the VBE2 is subject to the process variation; and a second transistor of the same type as the first transistor, comprising an emitter configured to be exposed to the VE, wherein the second transistor is biased with a constant base current (IB), and is configured for providing a restored bandgap voltage (VBG2) based on increasing the VE by a third base-emitter voltage (VBE3), wherein the VBE3 is based on a proportional to absolute temperature (PTAT) current.

2. The electronic device of claim 1, further comprising a branch connected to the emitter of the first transistor and to the emitter of the second transistor, so that the branch is configured to carry a summed emitter current (IE).

3. The electronic device of claim 1, wherein the VBE1 is subject to process variation due to being generated by a bandgap core transistor, and wherein the first transistor and the second transistor are of the same type as the core transistor.

4. An electronic device comprising:

a terminal configured for receiving a bandgap voltage reference (VBG) generated by incorporating a first base-emitter voltage (VBE1), wherein the VBE1 Is subject to process variation;

a first transistor comprising a base configured to be exposed to the VBG, wherein the first transistor is biased with a constant collector current (IC) corresponding with the VBE1, and is configured for providing a shifted voltage (VE) based on decreasing the VBG by a second base-emitter voltage (VBE2), and wherein the VBE2 is subject to the process variation;

a second transistor of the same type as the first transistor, comprising an emitter configured to be exposed to the VE, wherein the second transistor is biased with a constant base current (IB) and is configured for providing a restored bandgap voltage (VBG2) based on increasing the VE by a third base-emitter voltage (VBE3);

a branch connected to the emitter of the first transistor and to the emitter of the second transistor, so that the branch is configured to carry a summed emitter current (IE);

a first current mirror arranged to mirror the IE, wherein the first current mirror comprises:

a first branch configured for carrying a scaled base current (β*IB) and a core current (ICORE);

a second branch configured for carrying the IE the first branch of the first current mirror comprising a second current mirror arranged to mirror the β*IB supplied to the collector of the second transistor;

a third transistor comprising a base configured to be exposed to the IB, wherein the third transistor is configured for providing the β*IB in the first branch to be summed with the ICORE; and a terminal arranged to supply the ICORE, into the first branch to be summed with the β*IB.

5. An electronic device comprising:

a terminal configured for receiving a bandgap voltage reference (VBG) generated by incorporating a first base-emitter voltage (VBE1), wherein the VBE1 is subject to process variation;

a first transistor comprising a base configured to be exposed to the VBG, wherein the first transistor is biased with a constant collector current (IC) corresponding with the VBE1, and is configured for providing a shifted voltage (VE) based on decreasing the VBG by a second base-emitter voltage (VBE2), and wherein the VBE2 is subject to the process variation;

a second transistor of the same type as the first transistor, comprising an emitter configured to be exposed to the VE, wherein the second transistor is biased with a constant base current (IB) and is configured for providing a restored bandgap voltage (VBG2) based on increasing the VE by a third base-emitter voltage (VBE3);

a branch connected to the emitter of the first transistor and to the emitter of the second transistor, so that the branch is configured to carry a summed emitter current (IE);

a first current mirror arranged to mirror the IE, wherein the first current mirror comprises:

a first branch configured for carrying a scaled base current (β*IB), and a core current (ICORE);

a second branch configured for carrying the IE:

the first branch of the first current mirror comprising a second current mirror arranged to mirror the ICORE supplied to the collector of the first transistor; and a third transistor arranged in parallel to the second current mirror of the first branch, wherein the third transistor comprises a base configured to be exposed to the IB, and wherein the third transistor is configured for providing the β*IB into the first branch to be summed with the ICORE.

6. An electronic device comprising:

a terminal configured for receiving a bandgap voltage reference (VBG) generated by incorporating a first base-emitter voltage (VBE1), wherein the VBE1 is subject to process variation;

a first transistor comprising a base configured to be exposed to the VBG, wherein the first transistor is biased with a constant collector current (IC) corresponding with the VBE1 and is configured for providing a shifted voltage (VE) based on decreasing the VBG by a second base-emitter voltage (VBE2), and wherein the VBE2 is subject to the process variation;

a second transistor of the same type as the first transistor, comprising an emitter configured to be exposed to the VE, wherein the second transistor is biased with a constant base current (IB) and is configured for providing a restored bandgap voltage (VBG2) based on increasing the VE by a third base-emitter voltage (VBE3) wherein the VBE1 is subject to process variation due to being generated by a bandgap core transistor, and wherein the first transistor and the second transistor are of the same type as the core transistor.

7. The electronic device of claim 6, further comprising a branch connected to the emitter of the first transistor and to the emitter of the second transistor, so that the branch is configured to carry a summed emitter current (IE).

8. The electronic device of claim 6, further comprising a current mirror arranged to mirror the IE, wherein the current mirror comprises:

a first branch configured for carrying a scaled base current (β*IB), and a core current, (ICORE); and a second branch configured for carrying the IE.

* * * * *